(12) United States Patent
Raji et al.

(10) Patent No.: US 12,609,316 B2
(45) Date of Patent: Apr. 21, 2026

(54) ORDERED MIXTURE OF SULFURIZED-CARBON WITH IONICALLY CONDUCTIVE PARTICLES

(71) Applicant: Zeta Energy LLC, Houston, TX (US)

(72) Inventors: Abdul-Rahman Olabode Raji, Houston, TX (US); Rodrigo Villegas Salvatierra, Houston, TX (US); Tuo Wang, Houston, TX (US)

(73) Assignee: Zeta Energy LLC, Houston, TX (US)

( * ) Notice: Subject to any disclaimer, the term of this patent is extended or adjusted under 35 U.S.C. 154(b) by 544 days.

(21) Appl. No.: 18/112,668

(22) Filed: Feb. 22, 2023

(65) Prior Publication Data

US 2023/0290947 A1     Sep. 14, 2023

Related U.S. Application Data

(60) Provisional application No. 63/318,669, filed on Mar. 10, 2022.

(51) Int. Cl.
| | |
|---|---|
| *H01M 4/587* | (2010.01) |
| *H01M 4/02* | (2006.01) |
| *H01M 4/04* | (2006.01) |
| *H01M 10/0525* | (2010.01) |

(52) U.S. Cl.
CPC ......... *H01M 4/587* (2013.01); *H01M 4/0404* (2013.01); *H01M 10/0525* (2013.01); *H01M 2004/028* (2013.01)

(58) Field of Classification Search
CPC .............. H01M 4/587; H01M 4/0404; H01M 10/0525; H01M 2004/028; H01M 4/13; H01M 4/136; H01M 4/366; H01M 4/38; H01M 4/5815; H01M 4/382; H01M 10/052; H01M 4/625
See application file for complete search history.

(56) References Cited

U.S. PATENT DOCUMENTS

| | | | |
|---|---|---|---|
| 6,908,706 B2 | 6/2005 | Choi et al. | |
| 8,936,874 B2 | 1/2015 | Shi et al. | |
| 10,629,894 B2 | 4/2020 | Fanous et al. | |
| 2016/0329559 A1 | 11/2016 | Cairns et al. | |
| 2020/0365902 A1 | 11/2020 | Jang | |

(Continued)

FOREIGN PATENT DOCUMENTS

WO     WO-2020226322 A1 * 11/2020     ........ H01M 10/0562

OTHER PUBLICATIONS

Jung et al. WO 2020226322 A1 (Year: 2020).*

(Continued)

*Primary Examiner* — Stewart A Fraser
(74) *Attorney, Agent, or Firm* — Silicon Edge Law Group LLP; Arthur J. Behiel

(57) ABSTRACT

Described are active materials for storing metal cations, such as lithium ions, in a cathode of an electrochemical cell. The active materials comprise an ordered mixture of sulfurized carbon (SC) particles, smaller ionically conductive particles, and still smaller electrically conductive particles. In comparison with a random mixture, where SC particles are mixed with particles of another material, the ordered mixture creates discrete, solid composition of more than one type of guest particles on the perimeter of SC host particles for ionic and electronic conduction to and from the SC host particles.

20 Claims, 2 Drawing Sheets

(56) References Cited

U.S. PATENT DOCUMENTS

| | | | |
|---|---|---|---|
| 2021/0126258 A1* | 4/2021 | Bell | H01M 4/0435 |
| 2022/0190381 A1* | 6/2022 | Jung | H01M 4/131 |

OTHER PUBLICATIONS

Malvern, "A basic guide to particle characterization," 2015 Malvern Instruments Limited, 24 pages.

Isizercomadmin "What is Particle Size Distribution D50, D50, Particle Size Distribution 201", www.isizer.com, Mar. 25, 2021, 7 pages.

Saharan, V. A. et al. "Ordered Mixing: mechanism, process and applications in pharmaceutical formulations.", Asian Journal of Pharmaceutical Sciences, 2008, vol. 3, No. 6, pp. 240-259, 21 pages.

Tececo, "The Importance of Particle Packing for Strength (Tec-Cements) or Carbonation (Eco-Cements)", TecEco Pty. Ltd., 9 pages.

Wikipedia, "Solid-state electrolyte", retrieved from https://en.wikipedia.org, last edited Aug. 2021, 13 pages.

Zhang, Y. et al. "High Capacity All-Solid-State Lithium Battery Using Cathodes with Three-Dimensional Li+ Conductive Network", Journal of The Electrochemical Society, 2017, vo.164, No. 7, pp. A1695-A1702, 9 pages.

* cited by examiner

ORDERED MIXTURE OF SULFURIZED-CARBON WITH IONICALLY CONDUCTIVE PARTICLES

BACKGROUND

An electric battery includes one or more electric cells. Each cell includes a positive electrode (cathode) and a negative electrode (anode) physically separated by an ion conductor (electrolyte). When a cell is discharged to power an external circuit, the anode supplies negative charge carriers (electrons) to the cathode via the external circuit and positive charge carriers (cations) to the cathode via the internal electrolyte. During charging, an external power source drives electrons from the cathode to the anode and the resultant charge imbalance pulls cations from the cathode to the anode via the electrolyte.

Lithium-ion (Li-ion) batteries store charge in the anode as Li cations (aka Li ions). Li-ion cells are rechargeable and ubiquitous in mobile communications devices and electric vehicles due to their high energy density, a lack of memory effect, and low self-discharge rate. Lithium-metal cells store charge in the anode as lithium metal, which is superior to Li ions due to a higher theoretical specific capacity, lower electrochemical potential, and lower density. Unfortunately, rechargeable lithium-metal cells have yet to be commercialized at scale, mainly due to the growth of electrically conductive lithium dendrites that can extend from anode to cathode providing a destructive and potentially dangerous internal short. Also troubling, lithium metal produces side reactions with the electrolyte that consume both and increase cell impedance. Both dendrites and lithium side reactions reduce cell life below levels that are commercially viable for important markets.

Cathodes in popular lithium-based cells include cobalt, manganese, and nickel, all of which are mined at considerable financial and environmental cost. Also important, these materials are not distributed evenly across the globe, leading to fears of scarcity, supply disruptions, and concomitant political and economic instabilities. Cobalt is particularly troublesome because supply is located predominantly in the conflict-torn Democratic Republic of Congo and supply is dominated by a small number of companies. Newer cathodes address this issue using more readily available cathode metals, such as iron and phosphorous, but these materials have thus far provided relatively low specific capacities. Sulfur-based cathodes also lack troublesome elements and provide excellent specific capacities, but these benefits are offset by the "shuttle effect," a deleterious process by which elemental sulfur meant to reversibly store lithium ions forms soluble lithium polysulfides that are lost to the electrolyte and coat the anode during charging. The shuttle effect both reduces storage capacity and increases internal resistance.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

An active material for storing metal cations, such as lithium ions, in a cathode of an electrochemical cell comprises an ordered mixture of sulfurized carbon (SC) particles, smaller ionically conductive particles, and still smaller electrically conductive particles. In comparison with a random mixture, where SC particles are mixed with particles of another material, the ordered mixture creates discrete, solid composition of more than one type of guest particles on the perimeter of SC host particles for ionic and electronic conduction to and from the SC host particles. The mixture can be further sintered, or the particles otherwise bonded, while preserving the properties of the particles in discrete but electrically and physically conductive domains. In some embodiments, SC particles 105 are of amorphous carbon—sulfur in which the sulfur is tightly bonded to carbon via carbon-sulfur chemical bonds. The strength of the chemical bonds secures sulfur atoms within particles 105, and thus suppresses the formation of undesirable polysulfides.

Figure 1:
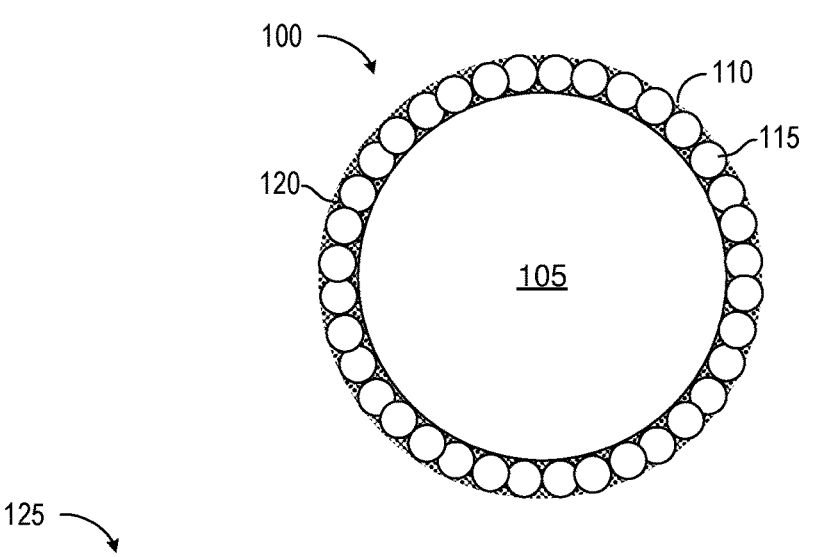
FIG. 1 depicts a composite particle 100 with an SC particle 105 inside a conductive envelope 110.
Figure 1:
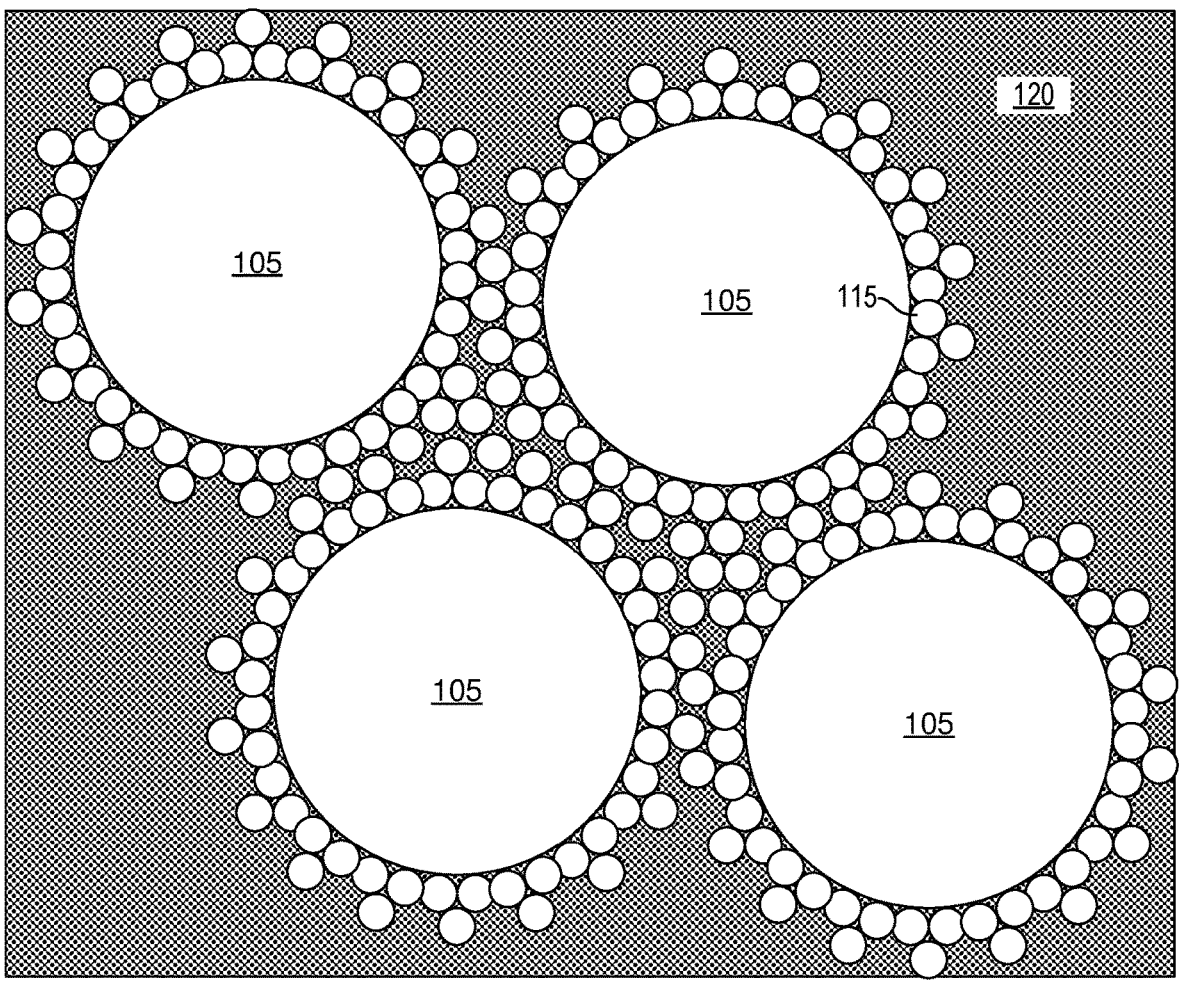

FIG. 1 depicts a composite particle 100 with an SC particle 105 inside a conductive envelope 110. When working as cathode active material, SC particle 105 stores and releases both lithium ions and electrons. Envelope 110 includes ionically conductive domains 115 that conduct the metal cations and electrically conductive domains 120 that conduct electrons. Ionically conductive domains 115 are closely packed particles that encompass and contact SC particle 105. Electrically conductive domains 120 can be closely packed particles too, likewise encompassing and in contact with SC particle 105, but are considerably smaller than domains 115 in this example. In one embodiment, SC particle 105 has a median particle size (D50) of about 5 ionically conductive domains 115 with a D50 of about 400 nm, and electrically conductive domains 120 with a D50 of about 60 nm. As detailed below, the domains can start as powders with particles of the approximate sizes listed here. Ionically conductive domains 115 can start as a powdered form of a solid electrolyte, and electrically conductive domains 120 a carbon-based conductor such as one or more of carbon black, acetylene black, carbon nanotubes, graphene, reduced graphene oxide, and various conductive polymers. In another embodiment, SC particle 105 has a D50 of about 5 ionically conductive domains 115 with a median particle size D50 of about 400 nm, and electrically conductive domains 120 with a D50 of about 400 nm. In another embodiment, SC particle 105 has a D50 of about 5 ionically conductive domains 115 with a median particle size D50 of about 50 nm, and electrically conductive domains 120 with a D50 of about 400 nm.

FIG. 1 also includes an illustration 125 showing how four composite particles 100 can be packed together in an ordered mixture to form active cathode material. Ionically conductive domains 115 separate SC particles 105 while collectively forming an ionically conductive network that transports ions to and from particles 105. Electrically conductive domains 120 form an electrically conductive network that transports electrons to and from particles 105. Domains 115 and 120 form envelopes 110 that encompass SC particles 105 to trap metal polysulfides. Domains 115 and 120 remain discrete, domains 115 (120) providing paths of high ion (electron) conductivity to and from SC particles 105. The electronic and ionic conductors are closely packed in this example but need not be separated to prevent the formation of metal within the active cathode material incorporated into an electrochemical cell. Cell voltages effectively eliminate metal formation on the cathode in the presence of liquid electrolyte.

Packing composite particles 100 brings domains 115 from adjacent composite particles 100 in contact. The resultant chains of ionically conductive domains 115 form one or more ionically conductive networks that extend throughout the cathode material. This packing likewise brings domains 120 from adjacent composite particles 100 in electrical contact, either directly or via an electrically conductive binder, to form electrically conductive networks that extend throughout the cathode material.

Illustration 125 shows particles 105 and domains 115 as circles or spheres. In practice, particles can be of various shapes. Moreover, the active cathode material formed of ordered particles can be sintered and compressed to improve the physical and electrical connectivity between the different materials while maintaining their separate properties. SC particles 105 can thus be considered ion-storage domains, just as the ionically conductive and electrically conductive particles become the ionically conductive and electrically conductive domains.

In embodiments in which domains 115 appears as discrete particles on surfaces of SC particles 105, most of domains 115 can have circular or oblong profiles, or most can have polygonal (e.g. tetrahedral) profiles. A compacting process, such as sintering, can morph the particle shapes after mixing. In some embodiments, one or both of domains 115 and 120 can penetrate the surfaces of SC particles 105. The surfaces of SC particles 105 can be coated with a spherical shell of a continuous film in lieu of discrete or fused particles, the film having a thickness less than the diameter of the SC particles. The surface film can be rough or smooth.

Envelopes 110 coating SC particles 105 can have valleys or gaps between ionically conductive domains 115. In some embodiments, the average size of the valleys is about the same as the average size of domains 115. In some embodiments, most of the valleys are less than 100 nm between domains 115, and most can be less than 50 nm, 10 nm, or 5 nm.

In some embodiments, most SC particles 105 have a diameter greater than 5 micrometers, and most can have a diameter between 10 and 30 micrometers, between 20 and 30 micrometers, or between 10 and 20 micrometers. In some embodiments, most SC particles 105 have a diameter less than 5 micrometers, less than 1 micrometer, or less than 100 nm.

In some embodiments, most domains 115 have a diameter less than 5 micrometers, less than 1 micrometer, less than 100 nm, or less than 20 nm. In some embodiments, the ordered mixture forms a predominantly continuous mass wherein the core sulfurized carbon particles are dispersed in a matrix formed by fusion of the surface particulate materials. In some embodiments, the ordered mixture of sulfurized carbon particulate is an agglomerate of smaller sulfurized carbon particles.

Various powders and particle sizes can be used to prepare an ordered mixture of sulfurized carbon and ionically and electrically conductive powders, e.g. electrically conductive carbon powder, ionically conducting powder, and a polymer binder powder. In one embodiment, an SC powder is mixed with the other powders at a median particle size (D50) ratio of at least 10:1, e.g. SC carbon particles having a D50 of about 2 μm and carbon black particle having a D50 of about 60 nm; SC particles having a D50 of about 3 μm and solid electrolyte particle having a D50 of about 300 nm; SC particles having a D50 of about 5 μm and carbon black particles having a D50 of about 60 nm and solid electrolyte particles having a D50 of about 400 nm. Particle size distribution D50, also known as the median diameter or the medium value of the particle size distribution, is the value of the particle diameter at 50% in the cumulative distribution. For example, if D50 is 5.8 um, then 50% of the particles in the sample are larger than 5.8 um, and 50% smaller than 5.8 um.

"Ordered mixing" is a term of art referring to a mixture that is more homogeneous than a random mixture, and an ordered mixture can be distinguished from a random one in that the particles of the relatively coarse powder, e.g. SC particles, are enveloped by the particles of the relatively fine powder or powders. The foregoing embodiments use ordered mixing to create envelopes that protect the SC particles while providing separate channels for ionic and electronic conduction.

Ordered mixing can be achieved by dry mechanical mixing, milling, triboelectrification, chemical adhesion, direct coating, and/or fluidization processes. The homogeneity of the mixture is enhanced when SC particles 105 are of a median diameter at least ten times that of the particles that form domains 115 and 120. Particle shape, size, attraction/cohesion, surface texture, and proportion of components in the ordered mixture are controlled or tuned by adjusting mixing time, rotor/blade/paddle speed, and strengths of the shear, compressive, impact, and attrition forces. The packing density and ionic and electrical conductivity can be increased relative to more random mixing.

Electrically conductive domains 120 can be or include one or more of carbon black, acetylene black, carbon nanotubes, graphene, reduced graphene oxide, and conductive polymer.

Ionically conductive domains 115 can be conductive (over 10E-5 S/cm) or highly conductive (over 10E-5 S/cm). In some embodiments, the ionically conductive materials comprise one or more of lithium polyacrylate (LiPAA), sodium polyacrylate (NaPAA), lithium carboxymethylcellulose (LiCMC), sodium carboxymethylcellulose (NaCMC), lithium polyethylene oxide (LiPEO), lithium polyvinylidene difluoride (LiPVDF). In some embodiments, the surface particulate material comprises one or more particles of solid electrolyte material, which is to say a solid material that is ionically conductive. The solid electrolyte material may be chosen from a group comprising solid electrolytes used in electrochemical cells, e.g. polyethylene oxide, lithium aluminum titanium phosphate (LATP), lithium aluminum germanium phosphate (NASICON LAGP), lithium lanthanum zirconate garnet (LLZO), tantalum-doped lithium lanthanum zirconate garnet (Ta-LLZO), aluminum-doped lithium lanthanum zirconate garnet (Al-LLZO), lithium phosphorous sulfide.

In some embodiments, the surface particulate materials are chemically or electrochemically stable, especially with respect to liquid electrolytes used in electrochemical cells, thus increasing the cycle stability of the ordered mixture in embodiment that use liquid electrolytes. In some embodiments, the surface particulate materials improve wetting property of the ordered mixture, especially in liquid electrolytes used in electrochemical cells, such as batteries, thus facilitating ionic transport.

Some embodiments of the ordered mixture include thermally stable and/or flame-retardant surface particulate material comprises one or more particles of oxide, fluoride, hydroxide, oxyhydroxide, phosphate, phosphide, sulfide, nitride, and carbon. The surface particulate coating can include one or more of magnesium oxide, aluminum oxide, aluminum fluoride, manganese oxide, manganese fluoride, zirconium oxide, hafnium oxide diamond, diamondlike carbon, carbon nitride, boron nitride.

In some embodiments, the surface particulate materials are thermally conductive, thus improving thermal conductivity of the ordered mixture. In some embodiments, the thermally stable and/or flame retardant surface particulate material comprises one or more particles of oxide, fluoride, hydroxide, oxyhydroxide, phosphate, phosphide, sulfide, nitride, and carbon. The surface particulate coating comprises one or more of magnesium oxide, aluminum oxide, aluminum fluoride, manganese oxide, manganese fluoride, zirconium oxide, hafnium oxide diamond, diamondlike carbon, carbon nanotubes, carbon black, acetylene black, carbon nitride, boron nitride.

The surface particulate materials can be magnetic. In some embodiments, the surface particulate materials are ferromagnetic, thus conferring orientation or alignment properties on the ordered mixture or response to a magnetic field. In some embodiments, the magnetic material comprises iron, iron oxide, nickel, nickel oxide.

In some embodiments, the surface particulate materials are multifunctional, which is to say that the surface particulate materials may contain components that together perform more than one function, e.g. both electronic conductor and ionic conductor. In some embodiments, surface coating comprises one or more particles of oxide, fluoride, hydroxide, oxyhydroxide, phosphate, phosphide, sulfide. Surface coating comprises one or more of lithium oxide, lithium fluoride, magnesium oxide, aluminum oxide, aluminum fluoride, manganese oxide, manganese fluoride, zirconium oxide.

In some embodiments, envelope 110 comprises one or more particles of polymer. The polymer may be chosen from a group comprising polymer materials used as binder, polymer electrolyte, and separator in electrochemical cells, including polyvinylidene difluoride (PVDF), polyacrylic acid (PAA), lithium polyacrylate (LiPAA), sodium polyacrylate (NaPAA), carboxymethylcellulose (CMC), lithium carboxymethylcellulose (LiCMC), sodium carboxymethylcellulose (NaCMC), polyethylene oxide (PEO), lithium polyethylene oxide (LiPEO), polyethylene (PE), polypropylene (PP), polyethyleneterephthalate (PTFE).

Figure 2:
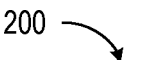
FIG. 2 depicts an energy-storage device 200, an electrochemical cell, with a cathode 205 and anode 210 separated by a liquid or solid electrolyte 215 and optional separator (not shown) of e.g. a porous polymer.
Figure 2:
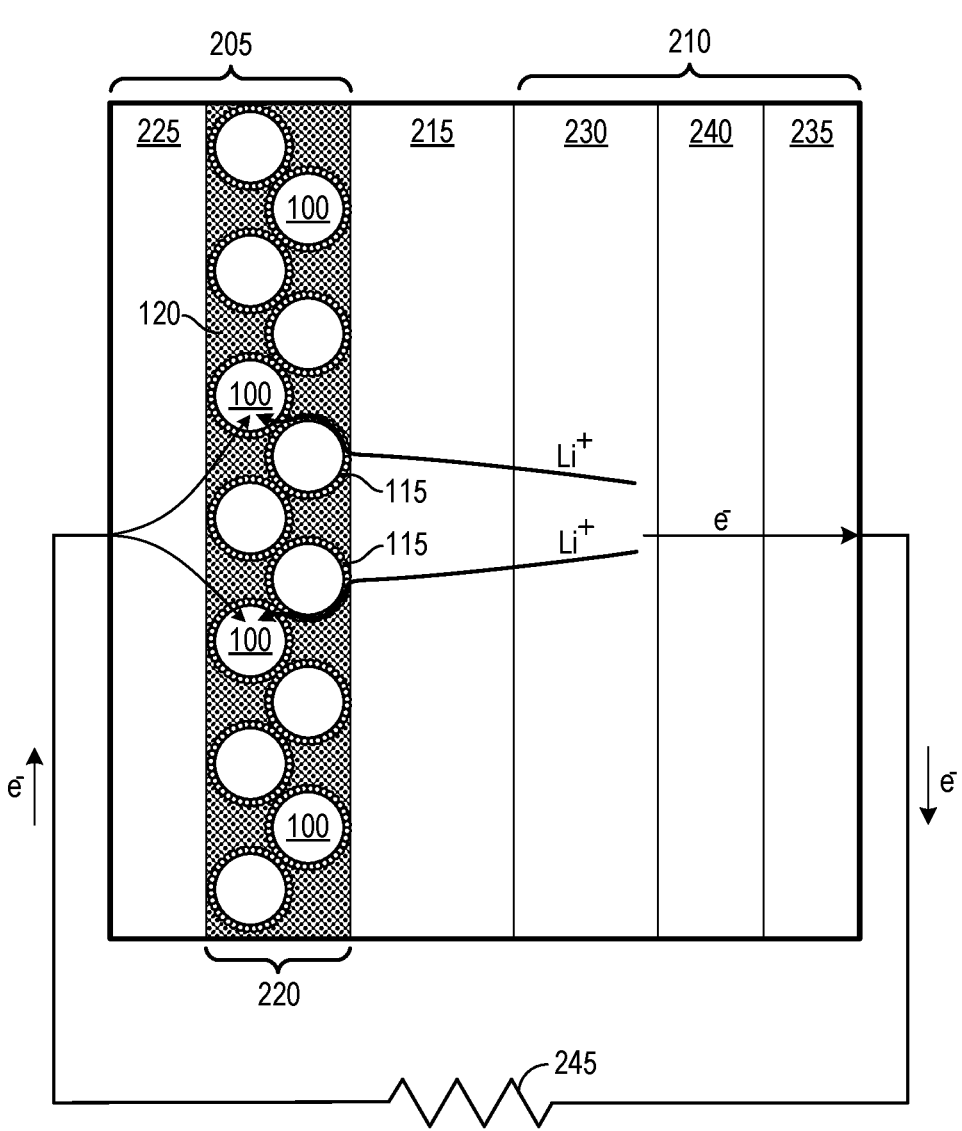

FIG. 2 depicts an energy-storage device 200, an electrochemical cell, with a cathode 205 and anode 210 separated by a liquid or solid electrolyte 215 and optional separator (not shown) of e.g. a porous polymer. Cathode 205 and anode 210 are each engineered to store relatively large quantities of lithium. Cathode 205 stores lithium in composite particles 100 that together form an active layer 220 with separate conductive networks for ions and electrons. A conductive network of domains 115 conveys ions to and from anode 210 via electrolyte 215, while domains 120 convey electrons to and from a cathode current collector 225 of e.g. aluminum. Anode 210 stores lithium metal within and between carbon nanotubes (CNTs) of an anode active layer 230. The CNTs are grown from and secured to a copper current collector 235 using an interfacial layer 240 that includes a catalyst for CNT growth. Suitable anodes are detailed in U.S. patent application Ser. No. 17/684,239 to Raji et al. entitled "Carbon Nanotube Carpet On and Grown from Copper," filed 1 Mar. 2022 and incorporated herein by reference.

Electrolyte 215 can be liquid or solid. As a liquid, electrolyte 215 can be e.g. 4 M lithium bis(fluorosulfonyl)

imide with a porous separator of e.g. 5 μm polyethylene. A solid electrolyte can be used to separate anode from cathode, in which case one or both active layers 220 and 230 can incorporate a liquid, paste, or jell electrolyte that facilitates ion flow between the solid electrolyte and the active materials. The electrolytes on either side of the solid electrolyte can be the same or different, depending on what best suits the anode and cathode active materials. Solid, or "solid-state," electrolytes can be inorganic (e.g. Lithium phosphorous oxynitride (LIPON), Lithium thiophosphate, or Lithium nitride) or polymer (e.g. polyethylene oxide).

Lithium in anode active layer 230 ionizes to produce lithium ions and electrons during cell discharge. The electrons power an external load 245, passing from anode 210 to cathode 205 via current collectors 225 and 235 and the load. An electrically conductive network of domains 120 conducts the electrons from current collector 225, between domains 115, to the SC cores of composite particles 100. Simultaneously, the lithium cations (Lit) pass from anode 210 to the SC cores of composite particles 100 via electrolyte 215 and an ionically conductive network of domains 115. Li cations from the electrolyte reduce sulfur within the SC cores of composite particles 100 and form lithium sulfides. Charging reverses this process by stripping lithium cations and electrons from composite particles of cathode active layer 220 and returning them to anode active layer 230 where they electroplate the CNTs to form a layer of lithium metal over and between the CNTs.

The capacity of anode 210 is a function of the quantity of lithium metal that can be stored in active layer 230, while the electrical impedance is a function of the ease with which charge carriers—Li cations and electrons—can enter and leave. For storage, the CNT carpet of layer 230 has a massive areal density, on the order of hundreds or thousands of square meters per gram, that is available for Li plating, yielding lithium storage capacities (Li mass/CNT mass) of hundreds or thousands of wt %. As for ion impedance, the CNTs extend generally in parallel from interfacial layer 240 so the paths in and out of layer 230 are relatively short and straight. The electron paths are also of low impedance. CNTs are excellent conductors, as are the copper and copper alloys of current collector 235 and interfacial layer 240. The interfaces between the layers of anode 210 are low resistance ohmic contacts that allow charge to flow easily in both directions.

Current collector 235 is or includes a base layer predominantly of copper. In one embodiment, current collector 235 is an 8 um copper foil that is 99.9% pure. Interfacial layer 240, formed during the manufacture of anode 210, is of a copper alloy with precipitate particles that catalyze and anchor the CNTs of anode active layer 230. Interfacial layer 240 can include other elements, such as oxygen, that may or may not catalyze CNT growth. The oxygen may come from native or grown surface copper oxide. The other elements may include metals, such as Ag, Ni, Cr, Al, Fe, Zn. The other elements may come from unintentional native or manufacturing trace impurities or they may be intentionally introduced. The other elements may or may not catalyze CNT growth. In one embodiment, the other elements are less than 20 wt. % of the copper surface. Based on information and belief, the CNTs have root structures that extend out of interfacial layer 240 from the catalyst precipitate particles and establish strong connections with beneficially low thermal and electrical impedance supported by metallic and covalent bonds.

The capacity and impedance of cathode 205 are primarily functions of active layer 220. For ion storage, the SC particles at the core of composite particles 100 exhibit high capacity. For conductivity, the networks of domains 115 and 120 are highly conductive to ions and electrons, respectively. In some embodiments the concentrations of domains 115 and 120 exhibit opposite concentration gradients in the direction of the movement of charged particles. The SC cores are coated with domains 115 and 120, as shown, but the space between composite particles 100 has a higher density of domains 115 toward electrolyte 215 and a higher density of domains 120 toward current collector 225. The density gradients lower the ionic conductivity where ion conduction dominates, electron conductivity where electron conduction dominates, and thus lowers the overall impedance of cathode 205.

While the present invention has been described in connection with specific embodiments, variations of these embodiments will be obvious to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An electrode to store metal cations, the electrode comprising:

sulfurized-carbon particles with an average sulfurized-carbon-particle surface area, the sulfurized-carbon particles to store the metal cations;

each sulfurized-carbon particle including a conductive envelope comprising:

electrically conductive domains in contact with the sulfurized-carbon-particle surface, the electrically conductive domains to conduct electrons to and from the sulfurized-carbon particle; and close packed ionically conductive particles in contact with the sulfurized-carbon-particle surface forming a continuous envelope around the sulfurized-carbon particle with gaps between adjacent ionically conductive particles sized to permit cation transport to the surface of the sulfurized-carbon particle, wherein the electrically conductive domains are predominantly located in valleys and interstices between the close-packed ionically conductive particles while remaining in contact with the sulfurized-carbon-particle surface, and wherein a median particle size of the ionically conductive particles is at least ten times a median particle size of the electrically conductive domains, the ionically conductive particles to conduct the metal cations to and from the sulfurized-carbon particle.

2. The electrode of claim 1, wherein the electrically conductive domains exhibit an electrical conductivity of at least 0.1 S/cm.

3. The electrode of claim 1, wherein the ionically conductive particles exhibit an ionic conductivity for the metal cations of at least 10E-5 S/cm.

4. The electrode of claim 1, wherein the ionically conductive particles exhibit an ionic conductivity for the metal cations of at least 10E-4 S/cm.

5. The electrode of claim 1, wherein the conductive envelope includes gaps between the ionically conductive particles.

6. The electrode of claim 1, wherein at least one of the electrically conductive domains and the ionically conductive particles are conductive particles.

7. The electrode of claim 6, wherein the conductive particles are spherical.

8. The electrode of claim 1, further comprising a current collector, wherein the ionically conductive particles connect into an ionically conductive network encompassing the sulfurized-carbon particles and in contact with the current collector.

9. The electrode of claim 8, wherein the electrically conductive domains connect into an electrically conductive network encompassing the sulfurized-carbon particles and in contact with the current collector.

10. The electrode of claim 1, further comprising a current collector, wherein the ionically conductive particles are of a concentration gradient that increases away from the current collector.

11. The electrode of claim 10, wherein the electrically conductive domains are of a second concentration gradient that increases toward the current collector.

12. The electrode of claim 1, wherein the sulfurized-carbon particles comprise agglomerations of smaller sulfurized-carbon particles.

13. The electrode of claim 1, wherein the electrically conductive domains are collectively smaller than the ionically conductive particles in dimensions tangential to the sulfurized-carbon-particle surface.

14. The electrode of claim 13, wherein the electrically conductive domains are on average smaller than the ionically conductive particles in a dimension normal to the sulfurized-carbon-particle surface.

15. The electrode of claim 1, the conductive envelope further comprising a liquid electrolyte.

16. The electrode of claim 15, wherein the liquid electrolyte is between and in contact with the ionically conductive particles.

17. The electrode of claim 1, wherein the cations are of lithium.

18. An electrochemical cell comprising:

an anode to store a metal;

an electrolyte in contact with the anode to conduct ions of the metal; and a cathode in contact with the electrolyte to store the ions of the metal, the cathode including:

sulfurized-carbon particles with an average sulfurized-carbon-particle surface area, the sulfurized-carbon particles to store the ions, each sulfurized-carbon particle including a conductive envelope comprising:

electrically conductive domains in contact with the sulfurized-carbon-particle surface, the electrically conductive domains to conduct electrons to and from the sulfurized-carbon particle; and close packed ionically conductive particles forming a continuous envelop around and in contact with the sulfurized-carbon-particle surface with gaps between adjacent ionically conductive particles sized to permit cation transport to the surface of the sulfurized-carbon particle, wherein the electrically conductive domains are predominantly located in valleys and interstices between the close-packed ionically conductive particles while remaining in contact with the sulfurized-carbon-particle surface and a median particle size of the ionically conductive particles is at least ten times a median particle size of the electrically conductive domains, the ionically conductive particles to conduct the ions of the metal to and from the sulfurized-carbon particle.

19. The electrochemical cell of claim 18, the cathode further comprising a current collector, wherein the ionically conductive particles connect into an ionically conductive network encompassing the sulfurized-carbon particles and in contact with the current collector.

20. The electrochemical cell of claim 19, wherein the electrically conductive domains connect into an electrically conductive network encompassing the sulfurized-carbon particles and in contact with the current collector.

* * * * *